United States Patent
Lemmers, Jr. et al.

(10) Patent No.: US 9,562,545 B2
(45) Date of Patent: Feb. 7, 2017

(54) PRESSURE SWITCH FOR OIL SUPPLY

(71) Applicant: HAMILTON SUNDSTRAND CORPORATION, Windsor Locks, CT (US)

(72) Inventors: Glenn C. Lemmers, Jr., Loves Park, IL (US); David S. Behling, Belvidere, IL (US); Paul K. Seiler, Rockford, IL (US); Charles R. Reuter, Granby, CT (US); Joshua J. Krecklow, Leaf River, IL (US); Leroy R. Rateike, Rockford, IL (US); Abiodun Okoya, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 145 days.

(21) Appl. No.: 14/188,819

(22) Filed: Feb. 25, 2014

(65) Prior Publication Data
US 2015/0240841 A1  Aug. 27, 2015

(51) Int. Cl.
*H01H 35/24* (2006.01)
*H01H 35/26* (2006.01)
(Continued)

(52) U.S. Cl.
CPC ............... *F15B 11/02* (2013.01); *F16K 11/10* (2013.01); *F16N 29/00* (2013.01); *H01H 33/91* (2013.01); *H01H 35/26* (2013.01); *H01H 35/34* (2013.01); *F15B 2211/5151* (2013.01); *F15B 2211/55* (2013.01); *F15B 2211/6355* (2013.01);
(Continued)

(58) Field of Classification Search
CPC ........ H01H 35/24; H01H 35/26; H01H 29/28; H01H 33/53; H01H 33/555; H01H 33/62; H01H 33/64; H01H 33/73; H01H 33/77; H01H 35/2614; H01H 35/2685; H01H 43/28; H01H 2207/026; H01H 2213/002; H01H 2213/01
USPC ...... 200/1 R, 81.9 R, 8 R, 9, 10, 8 A, 19.12, 200/61.25, 81 R, 81.4-81.8, 83 R, 83 A, 200/84 R, 221, 227, 228, 83 W, DIG. 31, 200/DIG. 5, 195, 211; 137/1, 2, 8, 9, 10, 137/12, 14, 15.19, 15.21, 15.22, 15.23, 137/15.24, 15.25, 15.26, 47, 808, 809, 137/810, 811, 812, 813, 814, 833, 101; 138/32, 37-46, DIG. 11
IPC ..................... H01H 35/24, 35/26, 35/34, 29/10, H01H 29/28, 33/70, 33/7007, 33/7015, 33/7023, 33/703, 33/7038, 33/7046, 33/72, 33/80, 33/85, 35/40, 35/355
See application file for complete search history.

(56) References Cited

U.S. PATENT DOCUMENTS 3,555,220 A * 1/1971 Wood ..................... H01H 35/34
200/83 N
3,668,355 A * 6/1972 Campbell ............ H01H 1/0201
200/266
(Continued)

FOREIGN PATENT DOCUMENTS

JP  3193272 B2 * 7/2001 ............. H01H 35/34
JP  2005302629 A  10/2005

OTHER PUBLICATIONS

European Search Report for European Patent Application No. 15156080.2 mailed Aug. 6, 2015.

*Primary Examiner* — Anthony R. Jimenez
(74) *Attorney, Agent, or Firm* — Carlson, Gaskey & Olds, PC

(57) ABSTRACT

A pressure switch including a pressure chamber and a moving disc. The moving disc is moveable in response to a pressure in the pressure chamber to cause contact between a moveable contact and a fixed contact. An orifice communicates a fluid pressure into the pressure chamber. The orifice provides a tortuous path for a fluid flow to reach the pressure chamber. An oil supply system and a generator are also disclosed.

13 Claims, 2 Drawing Sheets

(51) Int. Cl.
    *H01H 35/34*     (2006.01)
    *F15B 11/02*     (2006.01)
    *F16N 29/00*     (2006.01)
    *F16K 11/10*     (2006.01)
    *H01H 33/91*     (2006.01)

(52) U.S. Cl.
    CPC ...... *F16N 2210/20* (2013.01); *F16N 2250/04* (2013.01); *Y10T 137/86019* (2015.04)

(56) References Cited

U.S. PATENT DOCUMENTS

| | | | |
|---|---|---|---|
| 3,898,404 A | 8/1975 | Martincic | |
| 4,520,245 A * | 5/1985 | Ochsner | H01H 35/38 200/283 |
| 4,846,148 A | 7/1989 | Zifferer | |
| 5,308,940 A | 5/1994 | O'Brien et al. | |
| 5,338,908 A | 8/1994 | Rehman et al. | |
| 6,094,970 A | 8/2000 | Sprenger et al. | |
| 6,292,717 B1 * | 9/2001 | Alexander | G01R 19/2513 340/6.1 |
| 6,633,010 B2 | 10/2003 | Tanaka et al. | |
| 7,777,143 B2 | 8/2010 | Heuthorst et al. | |
| 8,362,633 B2 * | 1/2013 | Tsutsumi | F03D 9/001 290/44 |
| 8,413,494 B1 | 4/2013 | Lebron | |
| 2013/0230813 A1 | 9/2013 | McBrien | |
| 2013/0334360 A1 | 12/2013 | Norem et al. | |
| 2014/0007675 A1 | 1/2014 | Mehrer et al. | |

* cited by examiner

PRESSURE SWITCH FOR OIL SUPPLY

BACKGROUND OF THE INVENTION

This application relates to a pressure switch that utilizes an orifice including a tortuous flow path.

Pressure switches are known and utilized in any number of applications to monitor the pressure of an associated system.

In one example, oil is provided to a generator such as a generator associated with a gas turbine engine on an aircraft.

The pressure switch monitors the pressure. Typically, when the oil supply is initially started, the pressure will be relatively low and the switch may be in a closed position. At some point, the pressure reaches a predetermined amount and the switch will move to an open position. Then, the switch continues to be in the open position, unless the oil pressure drops. If the oil pressure drops, then the switch will move to the closed position. Should this occur, a signal may be provided that the oil pressure has dropped. The signal may be provided, as an example, as a light to be seen by the pilot in the cockpit of an associated aircraft.

The pressure switches as known include an orifice that connects a switch pressure chamber to the pressure line. There may be pressure pulsations on the line. If the orifice is too large, then those pulsations can damage the switch components as they will not be adequately damped.

On the other hand, if the orifice is made too small, then it may clog too often or delay opening and closing times.

SUMMARY OF THE INVENTION

A pressure switch including a pressure chamber and a moving disc. The moving disc is moveable in response to a pressure in the pressure chamber to cause contact between a moveable contact and a fixed contact. An orifice communicates a fluid pressure into the pressure chamber. The orifice provides a tortuous path for a fluid flow to reach the pressure chamber.

These and other features may be best understood from the following drawings and specification.

DETAILED DESCRIPTION

Figure 1:
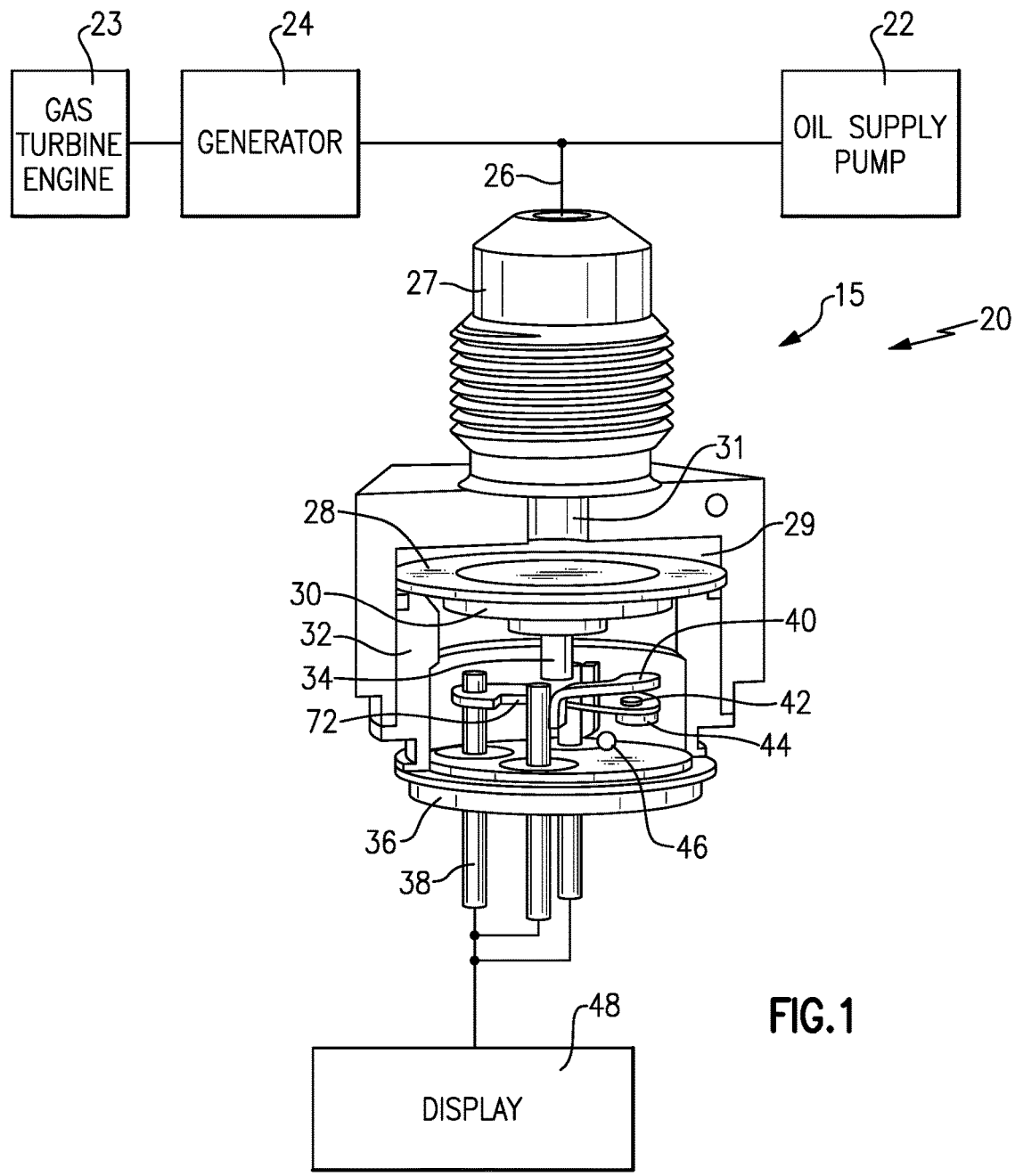
FIG. 1 schematically shows an oil supply system and switch.

FIG. 1 shows a system 20, somewhat schematically. A gas turbine engine 23 may be associated with an aircraft. The gas turbine engine drives a generator 24. An oil supply pump 22, contained within generator 24, delivers pressurized oil to the generator 24. A tap 26 off an oil supply line communicates with an orifice pack that is a part of a pressure switch 15. A port 31 leads into a pressure chamber 29. A pressure disc 28 sees the pressure in the chamber 29, and moves in response to that pressure within a case 32. A backup plate 30 moves with the pressure disc 28 and carries a contact pin 34. Contact pin 34 contacts moving switch parts 42 and 44 to move between fixed contact points 40 and 46. As the moving contact parts 42 and 44 move between the contact points, an electrical connection is made. A spring 72 biases the moving contact parts 42 and 44 upwardly. An outer housing 36 encloses the chamber. Terminals 38 communicate with a display 48 which may be a visible display, such as in an aircraft cockpit.

At startup of the associated gas turbine engine or generator 24, the oil pump 22 will be delivering oil at a relatively low pressure. However, at some point, that pressure will exceed a predetermined amount (e.g., 50 psi). At that point, the pressure disc 28 moves to break an electrical connection. This will then send a signal to the display 48. However, should that pressure ever drop below that predetermined amount, the pressure disc 28 will again move and the connection will be made. A distinct light will then be visible on the display 48. Thus, the switch 15 provides an indication should the pressure drop below the predetermined amount.

In the prior art, the size of the orifice within the orifice pack 27 needed to be of a minimum size to avoid clogging. However, this resulted in an undesirably large effective orifice size and pressure pulsations on the line 26 might lead to damage of the electrical components within the switch 15.

Figure 2:
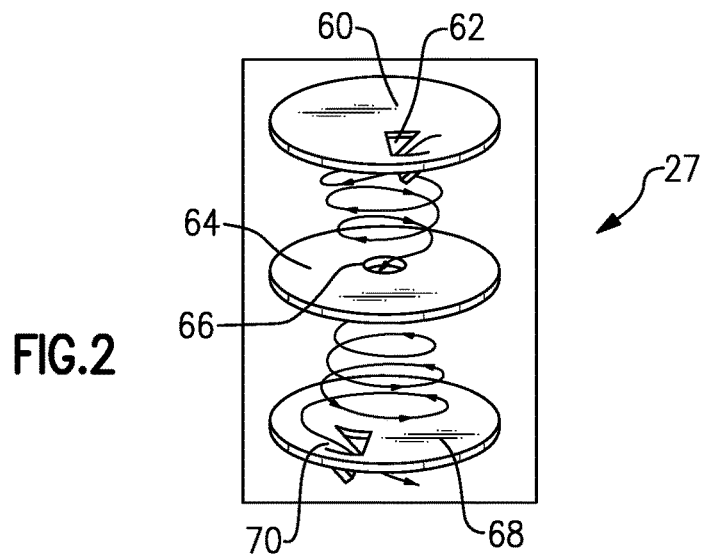
FIG. 2 schematically shows a detail of an orifice.

As shown in FIG. 2, the orifice pack 27 houses a particular arrangement including three discs 60, 64 and 68. A first disc 60 includes an orifice 62. The pressure flowing into the orifice 62 is caused to be spun in a first direction (say clockwise). An intermediate disc 64 causes an acceleration of the fluid through its orifice 66. Another disc 68 includes an orifice 70 that de-accelerates the flow and also reverses the direction of flow (say now counterclockwise).

The use of the discs 60, 64, 68 provides a tortuous path and allows the use of relatively large sized orifices 62, 66 and 70, while avoiding the problem of pressure pulsation as mentioned above. The orifice pack 27 effectively results in an effective orifice size that is smaller than the actual size of the orifices 62, 66, 70.

While a single orifice 62, 66 and 70 are shown in the discs, any one of the discs may have a plurality of orifices. In addition, there may be more than three discs. Generally, the discs 60, 64, 68 include discs which reverse a direction of flow.

In one example, an effective orifice size created by the serial flow through the reversing discs was 0.003 inch (0.00762 centimeter). In embodiments, the effective orifice is between 0.0028 inch (0.007112 centimeter) and 0.0032 inch (0.008128 centimeter). More broadly, the orifice pack 27 is one which causes a reversal of flow direction to allow the use of a large orifice while still damping pressure pulsations. Other ways of providing a tortuous flow path may also be used in embodiments.

In one embodiment, an orifice available under the trademark Visco Jet™ from the Lee Company may be utilized.

Figure 3:
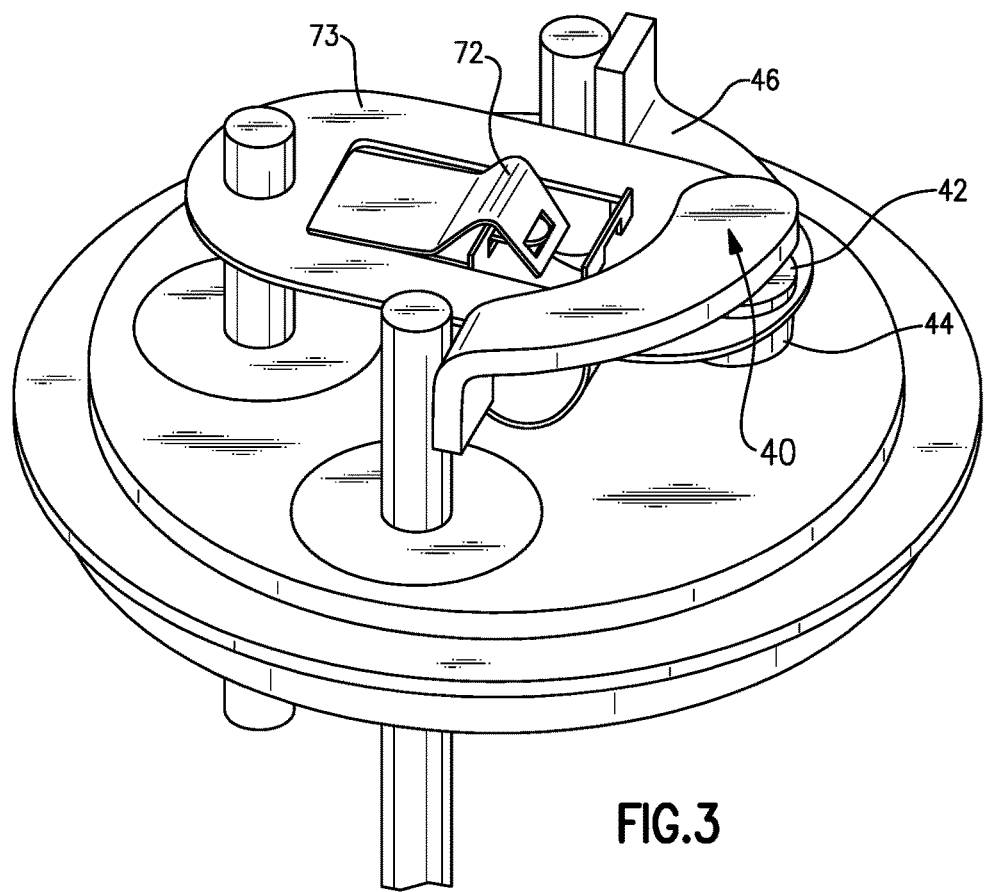
FIG. 3 shows details of the switch components.

FIG. 3 shows details of switch components including the fixed lower contact 46, the fixed upper contact 40, the moving contacts 42 and 44, a spring structure 72, and the moving contact 73. The point on spring 72 is what is contacted by the pin 34.

In the prior art, the moving contact portions 72 and 73 are stamped metal parts and, thus, have sometimes had burrs which create stress risers. Thus, in the switch 15, the moving contacts 72 and 73 are de-burred, stamped metal parts. Tumble burring may be utilized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A pressure switch comprising:
a pressure chamber and a moving disc, said moving disc being moveable in response to a pressure in said pressure chamber to cause contact between a moveable contact and a fixed contact;
an orifice pack for communicating a fluid pressure into said pressure chamber, said orifice pack providing a tortuous path for a fluid flow to reach the pressure chamber;
wherein said orifice pack includes at least two discs, each having at least one orifice, and a first disc of said at least two discs causing the fluid flow to flow in a counter-clockwise direction and a second disc of said at least two discs causing the fluid flow to begin flowing in a clockwise direction; and
there being an intermediate disc which accelerates the flow; said intermediate disc located between and substantially parallel to each of said first and second discs of said at least two discs.

2. The pressure switch as set forth in claim 1, wherein an orifice size of said orifice pack is between 0.0028 inch (0.0071 centimeters) and 0.0032 inch (0.0081 centimeters).

3. The pressure switch as set forth in claim 1, wherein said moveable contact is a de-burred, stamped metal part.

4. An oil supply system comprising:
an oil pump for delivering oil to a system, and a tap for monitoring a pressure of the oil;
a pressure switch for monitoring the pressure including a pressure chamber and a moving disc, said moving disc being moveable in response to a pressure in said pressure chamber to cause contact between a moveable contact and a fixed contact, an orifice pack for communicating a fluid pressure from said tap into said pressure chamber, said orifice pack providing a tortuous path for a fluid flow to reach the pressure chamber;
wherein said orifice pack includes at least two discs, each having at least one orifice, and a first disc of said at least two discs causing the fluid flow to flow in a counter-clockwise direction and a second disc of said at least two discs causing the fluid flow to begin flowing in a clockwise direction; and
there being an intermediate disc which accelerates the flow; said intermediate disc located between and substantially parallel to each of said first and second discs of said at least two discs.

5. The oil supply system as set forth in claim 4, wherein an orifice size of said orifice pack is between 0.0028 inch (0.0071 centimeters) and 0.0032 inch (0.0081 centimeters).

6. The oil supply system as set forth in claim 4, wherein said moveable contact is a de-burred stamped metal part.

7. The oil supply system as set forth in claim 4, wherein said moveable contact is moveable to a first position when said pressure passes a predetermined amount, and moveable away from said first position when said pressure drops below said predetermined amount and said switch communicating with a display to provide an indication that the moveable contact has moved away from said first position.

8. The oil supply system as set forth in claim 7, wherein said display is a visual display.

9. A generator and oil supply system comprising:
a generator receiving an oil supply from an oil pump and a pressure tap communicating with an oil supply line;
a pressure switch including a pressure chamber and a moving disc, said moving disc being moveable in response to the pressure in said pressure chamber to cause contact between a moveable contact and a fixed contact, an orifice pack communicating a fluid pressure from said tap to said pressure chamber, said orifice pack providing a tortuous path for a fluid flow to reach the pressure chamber;
wherein said orifice pack includes at least two discs, each having at least one orifice, and a first disc of said at least two discs causing the fluid flow to flow in a counter-clockwise direction and a second disc of said at least two discs causing the fluid flow to begin flowing in a clockwise direction; and
there being an intermediate disc which accelerates the flow; said intermediate disc located between and substantially parallel to each of said first and second discs of said at least two discs.

10. The generator and oil supply system as set forth in claim 9, wherein an orifice size of said orifice pack is between 0.0028 inch (0.0071 centimeters) and 0.0032 inch (0.0081 centimeters).

11. The generator and oil supply system as set forth in claim 9, wherein said moveable contact is a de-burred stamped metal part.

12. The generator and oil supply system as set forth in claim 9, wherein said moveable contact is moveable to a first position when said pressure passes a predetermined amount, and moveable away from said first position when said pressure drops below said predetermined amount and said switch communicating with a display to provide an indication that the moveable contact has moved away from the first position.

13. The generator and oil supply system as set forth in claim 12, wherein said display is a visual display.

\* \* \* \* \*